United States Patent [19]

Dressler

[11] 4,250,510

[45] Feb. 10, 1981

[54] FLUID JET DEVICE

[75] Inventor: John L. Dressler, Spring Valley, Ohio

[73] Assignee: The Mead Corporation, Dayton, Ohio

[21] Appl. No.: 71,917

[22] Filed: Sep. 4, 1979

[51] Int. Cl.[3] .......... G01D 15/18

[52] U.S. Cl. .......... 346/75; 346/140 R

[58] Field of Search .......... 346/75, 1, 140 R

[56] References Cited

U.S. PATENT DOCUMENTS

| | | | |
|---|---|---|---|
| 1,817,098 | 4/1931 | Ranger et al. | 346/75 |
| 1,941,001 | 12/1933 | Hansell | 346/75 |
| 3,656,171 | 4/1972 | Robertson | 346/75 |
| 3,656,174 | 4/1972 | Robertson | 346/75 |
| 3,787,881 | 1/1974 | Duffield | 346/75 |
| 4,122,458 | 10/1978 | Paranjpe | 346/75 |
| 4,123,760 | 10/1978 | Hou | 346/75 |

*Primary Examiner*—George H. Miller, Jr.
*Attorney, Agent, or Firm*—Biebel, French & Nauman

[57] ABSTRACT

A fluid jet device for depositing drops of fluid on a fluid receiving medium includes a print head means which defines a fluid receiving reservoir and which has a row of orifices communicating with the reservoir. Fluid is supplied to the reservoir under pressure and flows through the orifices to produce a row of fluid filaments. The fluid filaments are stimulated to break up into jet drop streams directed at the fluid receiving medium. The fluid in the reservoir is maintained at a predetermined electrical potential. An electrically conductive catcher means extends substantially parallel to the row of jet drop streams and electrically charges the drops formed from each of the filaments when a charge potential, differing from the predetermined electrical potential is applied to the catcher means. The charged drops are attracted toward the catcher means such that they are caught and prevented from striking the fluid receiving medium. Drops which are not charged by the catcher means travel past the catcher means and are deposited on the fluid receiving medium.

7 Claims, 2 Drawing Figures

FLUID JET DEVICE

BACKGROUND OF THE INVENTION

The present invention relates to fluid jet devices of the type which deposit drops of coating fluid from a plurality of jet drop streams on a fluid receiving medium and, more particularly, to such a device in which a simplified structure is provided for electrically charging, deflecting and catching drops in the jet drop streams to prevent their deposit upon the medium.

Numerous jet drop recorders, printers, and fluid coating devices have been utilized in the past to control the application of drops of fluid to a fluid receiving medium, such as a sheet of paper or a paper or fabric web. U.S. Pat. No. 3,787,881, issued Jan. 22, 1974, to Duffield, discloses a bar code printer in which a pair of charge electrodes is provided for gang charging groups of jet drop streams positioned in a single row. A separate deflection electrode and a conductive drop catcher are positioned on opposite sides of the row of jet drop streams for deflecting and catching the groups of drops which are charged in ganged fashion.

U.S. Pat. No. 4,122,458, issued Oct. 24, 1978, to Paranjpe, discloses an ink jet printer in which drops in each of the jet drop streams positioned in a row are charged by a single charge electrode. Deflection electrodes, associated with individual ones of the jet drop streams, thereafter control the trajectories of drops in each of the streams in order to provide selective printing of the drops in each stream at one of a plurality of print positions on a print receiving medium. The charge electrode and the deflection electrodes form part of a multi-layer structure, with sheets of insulating material sandwiched therebetween to provide electrical insulation.

U.S. Pat. No. 3,656,171, issued Apr. 11, 1972, to Robertson, discloses a jet drop recording device in which an associated one of a plurality of charge electrodes is positioned adjacent each of the jet drop streams in a row of such streams. Charged drops move past a conductive surface and induce on the surface a corresponding electrical charge which attracts the charged drops toward a drop catcher. Uncharged drops produce no such induced charge on the conductive surface and, therefore, travel past the conductive surface and the catcher, and strike the print receiving medium.

U.S. Pat. No. 3,656,174, issued Apr. 11, 1972, to Robertson, discloses another form of printer operating on the same deflection principle described above with respect to the Robertson U.S. Pat. No. 3,656,171. A circular array of jet drop streams pass downward through a single charge electrode which is configured as a hollow cylinder. If a charge potential is applied to the electrode, all of the drops in the jet drop streams are charged. These charged drops thereafter induce corresponding surface charges of opposite polarity on the interior surface of the cylinder. The charged drops are therefore deflected outward toward the cylinder surface and are caught by an apertured catcher plate positioned beneath the charge electrode.

U.S. Pat. No. 4,123,760, issued Oct. 31, 1978, to Hou, discloses an ink jet printer in which an assymmetrical charging and deflection field is selectively applied to jet drops emanating from a fluid filament with the result that the jets may be deflected to strike a catcher face. The charging and deflection field is produced by a pair of electrodes positioned to either side of the fluid filament and extending generally perpendicular to the face of the catcher.

U.S. Pat. Nos. 1,817,098, issued Aug. 4, 1931, to Ranger et al, and 1,941,001, issued Dec. 26, 1933, to Hansel, disclose printers using electrostatic jet deflection which do not include separate charge electrodes. Deflection electrodes in the disclosed printers receive deflection potentials to deflect drops selectively to a separate drop catcher structure.

SUMMARY OF THE INVENTION

A fluid jet device and a method of operating such a device provide for deposition of drops of fluid on a fluid receiving medium. The device includes a coating head defining a fluid receiving reservoir and having a row of orifices communicating with the reservoir. Means are provided for supplying an electrically conductive fluid to the reservoir under pressure, with the fluid flowing through the orifices to produce a row of fluid filaments. A means is provided for stimulating each of the fluid filaments to break up into a jet drop stream, thereby producing a row of jet drop streams directed at the fluid receiving medium. A means is provided for maintaining the fluid in the reservoir at a predetermined electrical potential. An electrically conductive catcher means, extending substantially parallel to the row of jet drop streams, electrically charges the drops formed from each of the filaments when a charge potential, differing from the predetermined potential, is applied to the catcher means and attracts the drops so charged toward the catcher means when a charge potential is applied to the catcher means. Charged drops are therefore caught and prevented from striking the fluid receiving medium, while uncharged drops travel past the catcher means and are deposited on the fluid receiving medium. A means is provided for applying the charge potential or the predetermined potential to the catcher means.

The electrically conductive catcher means may comprise conductive means defining a drop charging and catching surface extending substantially parallel to the row of jet drop streams. The catcher means may further comprise lip means extending parallel to and below the drop charging and catching surface and defining a drop ingesting slot with the conductive means. The drop ingesting slot communicates with a partially evacuated internal cavity for ingesting drops which strike the drop catching surface and which flow downward along the surface to the slot. The lip means may be positioned substantially closer to the row of jet drop streams than the drop charging and catching surface.

The means for applying a charge potential to the catcher means may comprise switch means for controlling application of the charge potential or the predetermined potential to the catcher means.

The method by which the fluid jet device controls the deposit of electrically conductive fluid drops from a row of jet drop streams on a fluid receiving medium comprises the following steps. An electrically conductive fluid is supplied under pressure to a fluid reservoir to produce fluid flow through a row of orifices with the fluid flow forming a row of fluid filaments extending from the orifices. Each of the fluid filaments is stimulated to break up into a jet drop stream, whereby a row of jet drop streams directed at the fluid receiving medium is produced. The fluid in the reservoir is maintained at a predetermined electrical potential and an electrically conductive drop catcher is positioned substantially parallel to and to one side of the row of jet drop streams. The electrical potential of the catcher is controlled whereby a charge potential, differing from the predetermined potential, may be applied to the catcher such that drops from the jet drop streams are charged by the catcher and are caught thereby. Alternatively, a ground potential may be applied to the catcher such that drops from the jet drop streams are deposited on the fluid receiving medium.

Accordingly, it is an object of the present invention to provide a fluid jet device and a method of controlling the deposit of electrically conductive fluid drops with such a device on a fluid receiving medium in which a single structural element is utilized for charging, deflection, and catching of drops to prevent the drops from striking the fluid receiving medium; to provide such a device and method in which the electrical potential of the single structural element controlling charging, deflection, and catching is alterable between a charge potential producing such charging, deflection, and catching and a noncharge potential; and to provide such a device and method in which charging, deflection, and catching of the drops in a plurality of jet drop streams are accomplished simultaneously for all of the streams.

Other objects and advantages of the invention will be apparent from the following description, the accompanying drawings and the appended claims.

DETAILED DESCRIPTION OF THE PREFERRED EMBODIMENTS

Figure 1:
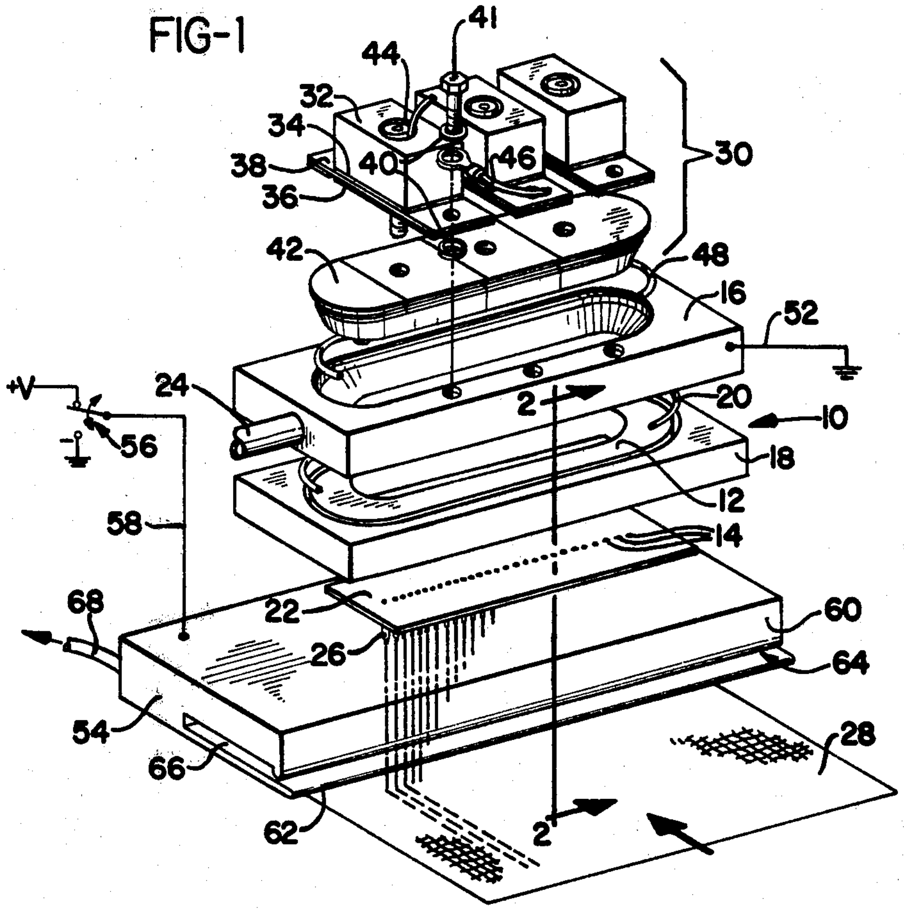
FIG. 1 is an exploded perspective view illustrating the fluid jet device and method of the present invention.
Figure 2:
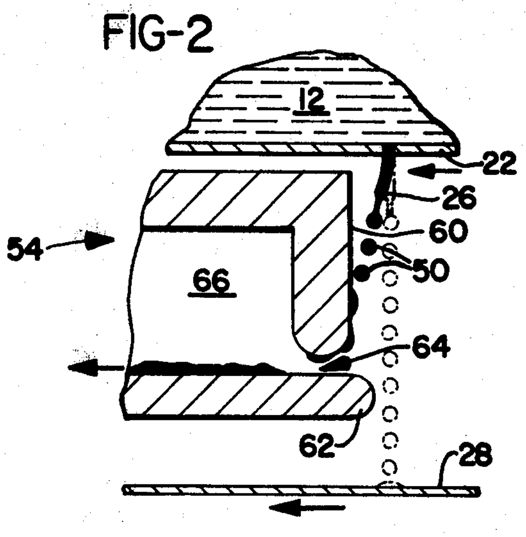
FIG. 2 is an enlarged partial sectional view of the device of FIG. 1, taken generally along line 2—2 in FIG. 1.

Reference is now made to FIGS. 1 and 2 which illustrate the fluid jet device of the present invention. A coating head means 10 defines a fluid receiving reservoir 12 and has a row of orifices 14 communicating with the reservoir 12. The coating head means includes a transducer holder 16, and a manifold block 18 with an intervening sealing O-ring 20. The print head means further comprises orifice plate 22 which is secured to the bottom of manifold block 18 and which defines the row of orifices 14. Orifice plate 22 is of relatively rigid construction and is secured by adhesion, soldering, or bolting against the lower surface of manifold block 18.

Fluid supply conduit 24 provides a means for supplying an electrically conductive fluid to the reservoir 12 under pressure. The fluid within the reservoir 12 flows downward through the orifices 14 to produce a row of fluid filaments 26.

A means for stimulating each of the fluid filaments 26 to break up into a jet drop stream, thereby producing a row of jet drop streams directed at fluid receiving medium 28, comprises a transducer assembly 30. Transducer assembly 30 is generally of the type disclosed in U.S. Pat. No. 4,138,687, issued Feb. 6, 1979, to Cha et al. Assembly 30 consists of a plurality of transducer subassemblies, each such subassembly including an upper backing plate 32, a pair of piezoelectric transducers 34 and 36, which are preferably thickness mode ceramic transducers, and a mounting plate 38 which also functions as an electrode for transducers 34 and 36. Mounting plate 38 is held between resilient mounting members 40 by bolts 41. Members 40 also act as electrical insulators. The transducer subassemblies are secured together by mounting the assemblies on electrically conductive piston member 42 with bolts 44 which extend through the transducer subassemblies into the piston member 42.

As will be described below, the fluid in reservoir 12 is maintained at a predetermined electrical potential which may, for instance, be ground electrical potential. The conductive piston member 42 is therefore grounded, as are the upper backing plates 32 which are electrically connected to the piston member 42 by bolt 44. An electrical transducer stimulation signal is applied to the mounting plate 30 via electrical leads 46 which results in mechanical vibration of the piston member 42 by the piezoelectric transducers 36 and 38 in a manner described more completely in the above identified Cha U.S. Pat. No. 4,138,687. The mechanical vibrations of the piston member 42, which is mounted within transducer holder 16 and surrounded by O-ring 48, produce downward moving plane waves which are coupled through the fluid in the reservoir 12 and which cause the fluid filaments 26 to break up into jet drop streams consisting of drops 50 of generally uniform size and spacing.

It will be appreciated that this stimulation arrangement is presented only for illustrative purposes and that other stimulation techniques, such as shown in U.S. Pat. No. 3,701,998, issued Oct. 31, 1972, to Mathis, may also be utilized in the present invention to produce the desired formation of jet drop streams.

Transducer holder 16 is formed of an electrically conductive material and, therefore, lead 52, electrically connected to manifold 16, provides a means for maintaining the fluid in the reservoir 12 at a predetermined electrical potential, such as ground potential.

Electrically conductive catcher means 54 extends substantially parallel to the row of jet drop streams. Catcher means 54 is provided for electrically charging the drops 50 formed from each of the filaments 26, as described below, when a charge potential is applied to the catcher means 54. The charged drops are attracted to the catcher means 54 when a charge potential is applied to the catcher means 54 such that the charged drops are caught and are prevented from striking the fluid receiving medium 28. Uncharged drops travel past the catcher means 54 and are deposited on the fluid receiving medium 28. Switch 56 provides a means for applying a charge potential to the catcher means 54 via electrical conductor 58.

The catcher means 54 defines a drop charging and catching surface 60 which extends substantially parallel to the row of jet drop streams. The catcher means 54 further comprises a lip means 62 which extends parallel to and below the drop charging and catching surface 60. The lip means 62 defines a drop ingesting slot 64 which communicates with a partially evacuated, internal cavity 66. Cavity 66 is shown as open at the ends of the catcher means 54 in FIG. 1, but it will be appreciated that cover plates are provided at the ends of the catcher means 54 in order to maintain the desired partial vacuum within the cavity 66. Vacuum tube 68 communicates with cavity 66 and is connected to a source of partial vacuum.

As seen in FIG. 2, drops which strike the drop catching surface 60 flow downward along the surface to slot 64 and are ingested into the cavity 66 by the partial vacuum maintained within the cavity. Fluid collected within cavity 66 is withdrawn through vacuum tube 68 and may be returned to a fluid supply tank for subsequent reuse. As illustrated in FIG. 2, the lip means 62 is positioned substantially closer to the row of jet drop streams than the drop charging and catching surface 60.

The fluid jet device of the present invention is extremely simple in construction and provides a means for depositing drops of fluid on a fluid receiving medium 28, which may, for example, be a paper or cloth web which is transported beneath the fluid jet device. Since the catcher means 54 consists of a single electrically conductive element extending along the entire length of the row of jet drop streams, it will be appreciated that drops in all of the jet drop streams are charged, deflected, and caught, or alternatively, permitted to strike the fluid receiving medium, simultaneously. Thus, the device of the present invention may find particular application where it is desired to coat portions of a web utilizing jet drop techniques.

As seen in FIG. 2, when an electrical charge potential, differing from the predetermined potential applied to the fluid in reservoir 12, is supplied to the catcher means 54 by switch 56, a charge of opposite polarity is induced on the tips of the fluid filaments and the fluid filaments 26 are deflected slightly toward the surface 60. As drops are formed from the fluid filaments, these drops carry away with them a portion of the induced charge. The charged drops, having been formed from fluid filaments deflected slightly toward the surface 60, are thereafter attracted electrostatically toward the surface 60. The charged drops impinge upon surface 60 and flow downward to slot 64 where they are ingested into cavity 66.

When it is desired to deposit drops from the jet drop streams on the fluid receiving medium 28, switch 56 is switched into its lower switch position, grounding the catcher means 54, and terminating drop charging. Since the drops are no longer charged or deflected, they travel downward past the catcher means 54 and are deposited on the fluid receiving medium 28.

By rapidly switching switch 56 between its upper and lower switching positions, the amount of fluid applied to medium 28 can be controlled. The medium 28 is moved beneath the device at a sufficiently slow speed in relation to the stimulation frequency such that successively produced drops in each jet drop stream, if uncharged, are deposited at substantially the same points on the medium. The fluid from successively deposited drops flows together to produce the desired coating on the medium. The amount of fluid deposited on the medium is therefore directly related to the duty cycle of the charge potential applied to catcher means 54. Clearly, if only every third drop which is generated is uncharged, the fluid coating on medium 28 will be only one third as great as would be the case if all the drops generated are uncharged. The switch 56 must be cyclically actuated at a sufficient rate, however, to insure that portions of the medium 28 do not go completely uncoated. It will be appreciated that the fluid coating applied to the medium may, in some instances, not remain on the surface. Depending upon the fluid composition and the type of material making up the medium 28, some or all of the fluid may be absorbed into the medium 28.

The catching action of catcher means 54 may be enhanced by providing a lower lip 62 which is substantially closer to the row of jet drop streams than the surface 60. Thus, drops which are deflected only minimally may still be caught. If desired, however, the lip 62 may be positioned somewhat further away from the row of jet drop streams. This may be appropriate in instances where substantial deflection of the charged drops is obtained.

While the method herein described, and the form of apparatus for carrying this method into effect constitute preferred embodiments of the invention, it is to be understood that the invention is not limited to this precise method and form of apparatus, and that changes may be made in either without departing from the scope of the invention.

What is claimed is:

1. A fluid jet device for depositing drops of fluid on a fluid receiving medium, comprising:

coating head means defining a fluid receiving reservoir and having a row of orifices communicating with said reservoir, means for supplying an electrically conductive fluid to said reservoir under pressure, said fluid flowing through said orifices to produce a row of fluid filaments, means for stimulating each of said fluid filaments to break up into a jet drop stream, thereby producing a row of jet drop streams directed at said fluid receiving medium, means for maintaining said fluid in said reservoir at a predetermined electrical potential, electrically conductive catcher means, defining a continuous electrically conductive drop charging and catching surface extending along the length of and substantially parallel to said row of jet drop streams, for electrically charging the drops formed from each of said filaments when a charge potential, differing from said predetermined electrical potential, is applied to said catcher means and for attracting the drops so charged toward said surface when said charge potential is applied to said catcher means, such that the charged drops are caught on said surface and are prevented from striking said fluid receiving medium, while uncharged drops are permitted to travel past said catcher means for deposit on said fluid receiving medium, and means for applying said charge potential or said predetermined potential to said catcher means such that said charge potential or said predetermined potential is impressed upon said surface.

2. The fluid jet device of claim 1 in which said means for applying a charge potential to said catcher means comprises switch means for controlling application of said charge potential or said predetermined potential to said catcher means.

3. The fluid jet device of claim 1 in which said electrically conductive catcher means comprises lip means extending parallel to and below said drop charging and catching surface, said catcher means defining a drop ingesting slot above said lip means, said drop ingesting slot communicating with a partially evacuated internal cavity within said catcher means for ingesting drops which strike said drop charging and catching surface and which flow downward along said surface to said slot.

4. The fluid jet device of claim 3 in which said lip means is positioned substantially closer to said row of jet drop streams than said drop charging and catching surface.

5. A method of controlling the deposit of electrically conductive fluid drops from a row of jet drop streams on a fluid receiving medium, comprising the steps of:

supplying electrically conductive fluid under pressure to a fluid reservoir to produce fluid flow through a row of orifices, said fluid flow forming a row of fluid filaments extending from said orifices, stimulating break up of each of said fluid filaments into a jet drop stream, whereby a row of jet drop streams directed at said fluid receiving medium is produced, maintaining said fluid in said reservoir at a predetermined electrical potential, positioning an electrically conductive drop catcher defining a continuous electrically conductive drop charging and catching surface extending along the length of and substantially prallel to said row of jet drop streams, and controlling the electrical potential of said drop charging and catching surface whereby a charge potential, differing from said predetermined potential, may be applied to said surface such that drops from said jet drop streams are charged by said catcher and are caught thereby, or said predetermined potential may be applied to said surface such that drops from said jet drop streams are deposited on said fluid receiving medium.

6. The method of claim 5 in which said step of controlling the electrical potential of said drop charging and catching surface includes the step of controlling a switch for application of a charge potential or said predetermined electrical potential to said drop charging and catching surface.

7. The method of claim 5 in which said step of positioning an electrically conductive drop catcher includes the step of positioning said drop charging and catching surface in proximity to said row of fluid filaments such that said fluid filaments are deflected toward said surface when said charge potential is applied thereto.

* * * * *

UNITED STATES PATENT AND TRADEMARK OFFICE

CERTIFICATE OF CORRECTION

PATENT NO. : 4,250,510

DATED : February 10, 1981

INVENTOR(S) : John L. Dressler

It is certified that error appears in the above-identified patent and that said Letters Patent are hereby corrected as shown below:

Claim 5, line 17, "prallel" should be --parallel--.

Signed and Sealed this

*Twenty-first* Day of *April 1981*

[SEAL]

*Attest:*

RENE D. TEGTMEYER

*Attesting Officer* *Acting Commissioner of Patents and Trademarks*